United States Patent [19]

Nakajima et al.

[11] Patent Number: 5,629,478
[45] Date of Patent: May 13, 1997

[54] METHOD OF AND DEVICE FOR DETECTING TIRE PRESSURE DROP BASED ON ANGULAR VELOCITY

[75] Inventors: Mikao Nakajima; Isao Isshiki, both of Osaka, Japan

[73] Assignees: Sumitomo Electric Industries Ltd., Osaka; Sumitomo Rubber Industries, Ltd., Hyogo, both of Japan

[21] Appl. No.: 570,004

[22] Filed: Dec. 8, 1995

[30] Foreign Application Priority Data

Dec. 15, 1994 [JP] Japan ................... 6-312123

[51] Int. Cl.$^6$ ................................... B60C 23/02
[52] U.S. Cl. .......................... 73/146.2; 340/444
[58] Field of Search .................. 73/146.2, 146.5; 340/444; 364/558

[56] References Cited

U.S. PATENT DOCUMENTS 5,248,957  9/1993  Walker et al. ................ 73/146.2

FOREIGN PATENT DOCUMENTS

| | | |
|---|---|---|
| 0466535A | 1/1992 | European Pat. Off. . |
| 0489562A1 | 6/1992 | European Pat. Off. . |
| 0564285A1 | 10/1993 | European Pat. Off. . |
| 63-305011 | 12/1988 | Japan . |
| 4-212609 | 8/1992 | Japan . |
| 7-164842 | 6/1995 | Japan . |

*Primary Examiner*—Richard Chilcot
*Assistant Examiner*—Joseph L. Felber
*Attorney, Agent, or Firm*—Rabin, Champagne & Lynt, P.C.

[57] ABSTRACT

A method of and a device for detecting a pneumatic pressure drop of tires provided for a vehicle are disclosed. Rotational angular velocities of tires are determined and a judged value D is determined based on the determined rotational angular velocities. A speed of the vehicle, a front/rear acceleration FRA of the vehicle, a lateral acceleration LA of the vehicle and a turning radius R of the vehicle are substituted into a predetermined polynominal expression which is defined so that an influence of the turning radius R is exerted on all terms to determine a correction value. A judged value D' after correction is determined by correcting the judged value D using the correction value. It is judged whether a tire pressure drops or not, based on the judged value D' after correction. In such way, a tire pressure drop can be detected, accurately, excluding an influence of the turning radius R of the vehicle.

22 Claims, 10 Drawing Sheets

F I G. 4
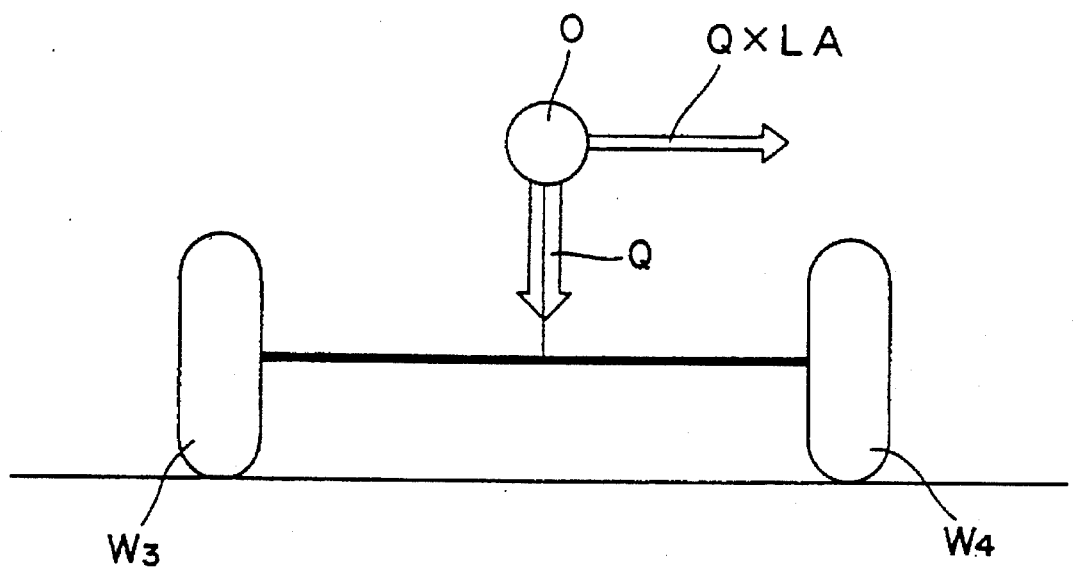

TURNING RADIUS $R_1$ OF VEHICLE
$D = \alpha_1 V_G + \beta_1$

METHOD OF AND DEVICE FOR DETECTING TIRE PRESSURE DROP BASED ON ANGULAR VELOCITY

BACKGROUND OF THE INVENTION

1. Field of the Invention

The present invention relates to a method of detecting a pneumatic pressure drop of the respective tires provided for a four-wheel vehicle, and a tire pressure drop detecting device for carrying out this method.

2. Description of the Related Art

As one of safety devices for a four-wheel vehicle such as automobile, truck, etc., tire pressure drop detecting devices have recently been proposed, and some of them have been put to practical use.

The tire pressure drop detecting device has been developed because it's importance is recognized due to the following reason. That is, when the pneumatic pressure drops, the temperature of the tire increases due to an increase of deflection. When the temperature becomes high, the strength of a polymer material used for the tire is lowered and the tire is likely to burst. Normally, even if the tire is deflated by a pressure of approximately 0.5 atm., a driver is often unaware of the deflation so that a device capable of detecting the deflation has been desired.

As one of methods of detecting a tire pressure drop, for example, there is a method of utilizing a difference in the respective rotational angular velocities $F_1$, $F_2$, $F_3$ and $F_4$ (referred to as a "rotational angular velocity $F_i$," hereinafter) of four tires $W_1$, $W_2$, $W_3$ and $W_4$ (referred to as a "tire $W_i$ hereinafter) provided for the vehicle. The tires $W_1$ and $W_2$ correspond to right front and left front tires, and the tires $W_3$ and $W_4$ correspond to right rear and left rear tires, respectively.

According to this method, the rotational angular velocities $F_i$ of the tires $W_i$ are detected every predetermined sampling period, based on a signal to be outputted from a wheel speed sensors mounted on respective tires. When effective rolling radiuses of four tires $W_i$ are the same and, at the same time, the vehicle is traveling linearly, four detected rotational angular velocities $F_i$ are the same. The effective rolling radius is a value obtained by dividing by $2\pi$ a travel distance of the vehicle while the tire makes one free revolution.

The effective rolling radius of the tire $W_i$ varies depending on the change in pneumatic pressure of the tire $W_i$. That is, when the pneumatic pressure of the tire $W_i$ drops, the effective rolling radius becomes smaller than that at a normal internal pressure. Accordingly, the rotational angular velocity $F_i$ of the tire $W_i$ whose pneumatic pressure drops becomes larger than that at a normal internal pressure. Therefore, the pressure drop of the tire $W_i$ can be detected based on the difference in rotational angular velocities $F_i$ of four tires.

One embodiment of a method of determining the pressure drop of the tire $W_i$ based on the difference in rotational angular velocities $F_i$ is as shown in the following equation (1) (e.g. see Japanese Laid-Open Patent Publication Nos. 63-305011 or 4-212609).

$$D = \frac{\frac{F_1+F_4}{2} - \frac{F_2+F_3}{2}}{\frac{F_1+F_2+F_3+F_4}{4}} \quad (1)$$

For example, when it is assumed that the effective rolling radiuses of four tires $W_i$ are the same, the rotational angular velocities $F_i$ are the same ($F_1=F_2=F_3=F_4$). Accordingly, the judged value D becomes 0. Then, threshold values $D_{TH1}$ and $D_{TH2}$ are set ($D_{TH1}$, $D_{TH2}>0$). If the condition shown in the following expression (2) is satisfied, it is judged that one of the tires $W_i$ has a pneumatic pressure drop. If this condition is not satisfied, it is judged that none of the tires $W_i$ has a pneumatic pressure drop.

$$D < -D_{TH1} \text{ or } D > D_{TH2} \quad (2)$$

By the way, the effective rolling radius of the tire $W_i$ varies depending on factors such as variation in tire radius at the time of producing the tires $W_i$, from that indicated by the design specification (referred to as an "initial difference" hereinafter), speed of the vehicle, turning radius of the vehicle, front/rear acceleration exerted on the vehicle, lateral acceleration exerted on the vehicle, etc.

Accordingly, even if the pneumatic pressure of the tire $W_i$ is normal, the effective rolling radius of the tire $W_i$ varies depending on the above variable factors. Thereby, the rotational angular velocity $F_i$ of the tire $W_i$ varies. As a result, the above judged value D is likely to become a value other than 0. Therefore, there is a fear of causing a wrong detection, that is, it is judged that the pneumatic pressure drops in spite of no pressure drop. Therefore, it is necessary to exclude the influence of the above factors other than pressure drop which vary the effective rolling radius of the tire, so as to detect the pressure drop with high accuracy.

The technique for excluding the influence of factors including the speed, turning radius, front/rear acceleration and lateral acceleration of the vehicle from the tire pressure drop detection is, for example, disclosed in Japanese Laid-Open Patent Publication No. 7-164842 (laid-open on Jun. 27, 1995) by one of the inventors of the present application. In the technique disclosed in this document, the corrected value C can be determined according to the following equation (3) using the speed V, turning radius R, front/rear acceleration FRA and lateral acceleration LA of the vehicle determined based on the output of the wheel speed sensor provided for each tire $W_i$ of the four-wheel vehicle. The judged value D which was previously calculated is corrected as shown in the following equation (4), using this correction value C, thereby determining the judged value D' after correction.

$$C = (K1 \times V \times FRA \times LA) + (K2 \times V \times LA) + (K3 \times 1/R) + K4 \quad (3)$$

$$D' = D - C \quad (4)$$

Factors K1 to K4 of the corrected value C respectively indicate constants which are obtained empirically under the condition where it has already been known that all tires $W_i$ have a normal internal pressure and a certain range of the front/rear acceleration FRA and lateral acceleration LA act on the vehicle and, at the same time, the vehicle is traveling along a path having a turning radius R.

In such way, the previously calculated judged value D is subjected to the correction suited to variable factors including the speed V, turning radius R, front/rear acceleration FRA and lateral acceleration LA of the vehicle. Thereby, the judged D' in which the influence of the above variable factors have been excluded should be obtained, as a matter of course.

By the way, FIG. 7, FIG. 8 and FIG. 9 are graphs illustrating a relationship between the judged value D which was measured, when the vehicle was traveling at constant speed (various speeds V) where all tires $W_i$ had a normal internal pressure, and a product $V_G$ of the speed V and lateral acceleration LA of the vehicle at that time, respectively. FIG. 7, FIG. 8 and FIG. 9 correspond to the cases where the vehicle traveled along pathes in which the turning radiuses R of the vehicle become $R_1$, $R_2$ and $R_3$ (e.g. $R_1$=40 m, $R_2$=57 m, $R_3$=150 m), respectively.

In the respective figures, when the method of least squares is applied using a primary equation: $D=\alpha V_G+\beta$, the following equations (5), (6) and (7) can be obtained.

$$D=\alpha_1 V_G+\beta_1 \tag{5}$$

$$D=\alpha_2 V_G+\beta_2 \tag{6}$$

$$D=\alpha_3 V_G+\beta_3 \tag{7}$$

where $\alpha_1$, $\alpha_2$ and $\alpha_3$ correspond to the factor K2 in the equation (3), respectively. When $R_1$ is 40 m, $R_2$ is 57 m, and $R_3$ is 150 m, $\alpha_1$, $\alpha_2$ and $\alpha_3$ become 0.029, 0.025 and 0.008, respectively. As shown in FIG. 10, this factor K2 varies depending on the change in turning radius R of the vehicle.

However, in the above equation (3), a trial of excluding the influence of the turning radius R of the vehicle from the tire pressure drop detection is made exclusively by the term of (K3×1/R) as the third term of the right side. That is, regarding the second term including the factor K2, the influence of the turning radius R of the vehicle is not taken into consideration.

In addition, it has also been understood that the first term of the right side of the above equation (3) is influenced by the above variable factors, particularly turning radius R of the vehicle.

Therefore, even if the judged value D is corrected by the correction value C determined by the above equation (3), the influence of the above variable factors can not be excluded, sufficiently, and hence the tire pressure drop is not detected accurately.

SUMMARY OF THE INVENTION

An object of the present invention is to exclude with certainty an influence of the turning radius of a vehicle, upon detection of a tire pressure drop, thereby providing a method capable of detecting with certainty the pneumatic pressure of a tire has dropped.

Another object of the present invention is to exclude with certainty an influence of the turning radius of a vehicle upon detection of a tire pressure drop, thereby providing a tire pressure drop detecting device capable of detecting with certainty that a pneumatic pressure of a tire has dropped.

According to the present invention, rotational angular velocities of tires are determined and a judged value D is determined based on the determined rotational angular velocities. Furthermore, a correction value is determined by substituting a speed of the vehicle V, a front/rear acceleration FRA of the vehicle, a lateral acceleration LA of the vehicle and a turning radius R of the vehicle into a predetermined polynominal expression which is defined so that the influence of the turning radius R is exerted on all terms. A judged value D is corrected using this correction value, thereby determining a judged value D' after correction. It is judged whether the pneumatic pressure of the tire drops or not, based on this judged value D' after correction.

As described above, the influence of the turning radius R of the vehicle is exerted on all terms of the polynominal expression for determining the correction value. Therefore, the judged value D is to be subjected to the correction for excluding the influence of the turning radius R of the vehicle. Thereby, the influence of the turning radius R can be completely excluded so that the tire pressure drop can be certainly detected.

Further, the predetermined polynominal expression may be the following equation (A) for determining a correction value C1:

$$C1 = \frac{LA\ (A1 + A2 \times V^2 + A3 \times FRA)}{|R|} \tag{A}$$

where A1, A2 and A3 indicate constants, respectively.

In addition, the predetermined polynominal expression may be the following equation (B) for determining a correction value C2:

$$C2 = \frac{LA\ (B1 + B2 \times V + B3 \times FRA)}{|R|} \tag{B}$$

where B1, B2 and B3 indicate constants, respectively.

Furthermore, the predetermined polynominal expression may be the following equation (C) for determining a correction value C3:

$$C3 = \frac{LA\ (E1 \times V + E2 \times FRA)}{|R|} \tag{C}$$

where E1 and E2 indicate constants, respectively.

An error contained in the correction value can be decreased more by applying the correction value C2 or C3 of the equation (B) or (C) than by using the correction value C1 of the equation (A). This is because the exponent of the speed V of the vehicle in the equation (B) or (C) is smaller than that of the equation (A). For example, it is assumed that, where the vehicle has four tires, the speed of the vehicle can be determined based on the rotational angular velocities of the four tires. In this case, effective rolling radiuses of the four tires sometimes vary depending on an initial difference, and this initial difference appears as an error in the detection of the rotational angular velocities. The influence of this detection error is increased more as an exponent of the speed V of the vehicle becomes larger. Therefore, it is sometimes preferred to apply the above equation (B) or (C) in which the exponent of the speed V of the vehicle is small.

In addition, the predetermined polynominal expression may have a term which includes the front/rear acceleration of the vehicle. In this case, it is preferred to apply the first constant as a factor of the term including the front/rear acceleration when the vehicle is traveling with accelerated speed, and to apply the second constant as a factor of the term including the front/rear acceleration, when the vehicle is traveling with decelerated speed. Thereby, it is possible to subject the judged value to the correction which is suitable for practical use.

In addition, where the vehicle is a four-wheel vehicle provided with four tires, it is preferred to determine rotational angular velocities $F2_1$, $F2_2$, $F2_3$ and $F2_4$ of the four tires.

In this case, it is preferred to determine a judged value D by substituting the rotational angular velocities $F2_1$, $F2_2$, $F2_3$ and $F2_4$ of the four tires into the following equation:

$$D = \frac{\frac{F2_1+F2_4}{2} - \frac{F2_2+F2_3}{2}}{\frac{F2_1+F2_2+F2_3+F2_4}{4}}$$

In addition, where a vehicle is the four-wheel vehicle, it is preferred to determine the rotational angular speeds of the tires as follows. That is, rotational angular velocities $F_1$, $F_2$, $F_3$ and $F_4$ of the four tires are firstly calculated based on an output signal of wheel speed sensors. Then, the rotational angular velocities $F_1$, $F_2$, $F_3$ and $F_4$ of the four tires are corrected to calculate rotational angular velocities $F1_1$, $F1_2$, $F1_3$ and $F1_4$ in which the initial difference is corrected. Furthermore, the rotational angular velocities $F1_1$, $F1_2$, $F1_3$ and $F1_4$ in which the initial difference is corrected, are further corrected to calculate rotational angular velocities $F2_1$, $F2_2$, $F2_3$ and $F2_4$ in which a variation caused by a difference in distance from a turning center of the vehicle to the respective tires is excluded.

When the vehicle is turning at a corner, for example, the rotational angular velocities of the tires vary due to the distance from the turning center to the tires. Therefore, as described above, if the rotational angular velocities are corrected based on the distance from the turning center to the tires to determine the traveling situation or the judged value D of the vehicle based on the corrected rotational angular velocities, the variation caused by the difference in distance from the turning center to the tires can be excluded completely.

In addition, the rotational angular velocities are corrected according to the distance from the turning center to the tires to determine the traveling situation or judged value D of the vehicle based on the corrected rotational angular velocities and, therefore, the influence of the difference in inner and outer wheels of the vehicle can be excluded with certainty.

Furthermore, the speed V of the vehicle, front/rear acceleration FRA of the vehicle and lateral acceleration L of the vehicle may be determined based on the rotational angular velocities $F2_1$, $F2_2$, $F2_3$ and $F2_4$.

In addition, it is preferred to determine the turning radius R so as to exclude the influence of the load movement of the vehicle.

In addition, it is preferred to determine the judged value D' after correction, so as to allow subtraction of the correction value from the judged value D before correction.

Furthermore, it is preferred to judge that a reduced pressure tire is not present if the judged value D' after correction is within a predetermined range and a reduced pressure tire is present if the judged value D' after correction is not within the predetermined range.

The above objects as well as other objects, features and effects of the present invention will become more apparent to those skilled in the art from the following description with reference to the accompanying drawings.

BRIEF DESCRIPTION OF DRAWINGS

FIG. 4 is an illustration for explaining a lateral acceleration exerted on the vehicle.

DESCRIPTION OF THE PREFERRED EMBODIMENTS

Figure 1:
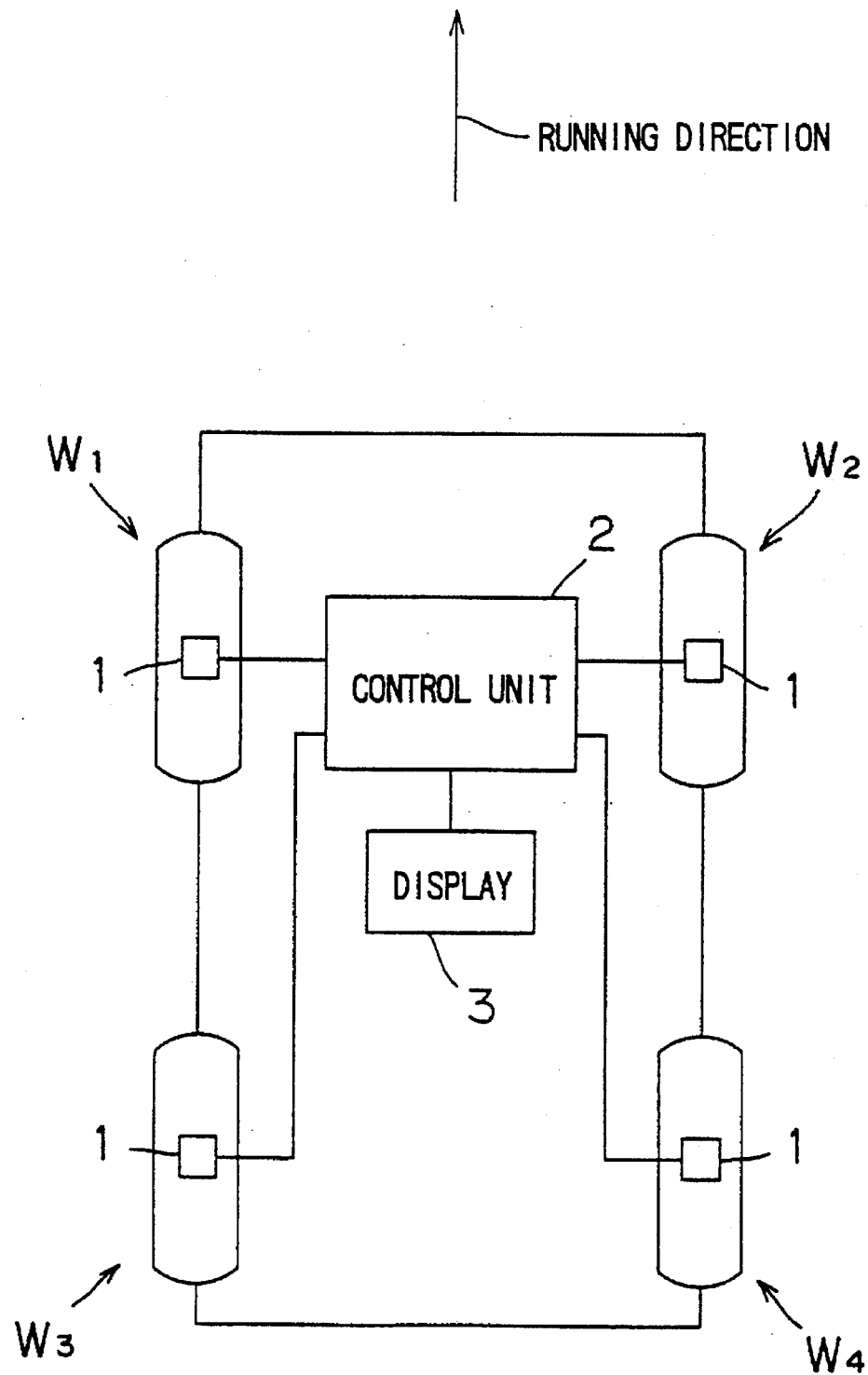
FIG. 1 is a schematic block diagram showing the construction of a tire pressure drop detecting device as one embodiment of the present invention.

FIG. 1 is a block diagram showing the fundamental construction of a tire pressure drop detecting device as one embodiment of the present invention. This tire pressure drop detecting device detects whether the pneumatic pressures of four tires $W_1$, $W_2$, $W_3$ and $W_4$ (referred to as a "tire $W_i$" hereinafter) provided for the four-tire vehicle drop or not. The tires $W_1$ and $W_2$ correspond to right front and left front tires, and the tires $W_3$ and $W_4$ correspond to right rear and left rear tires, respectively. The tires $W_1$, $W_2$, $W_3$ and $W_4$ are associated with wheel speed sensors 1, respectively. Output signals of each of the wheel speed sensor 1 are supplied to a control unit 2. An indicator 3 for indicating the tire $W_i$ whose pneumatic pressure has possibly dropped is connected to the control unit 2. This indicator 3 may be constructed in the form of a liquid display element, a plasma display element or a CRT.

Figure 2:
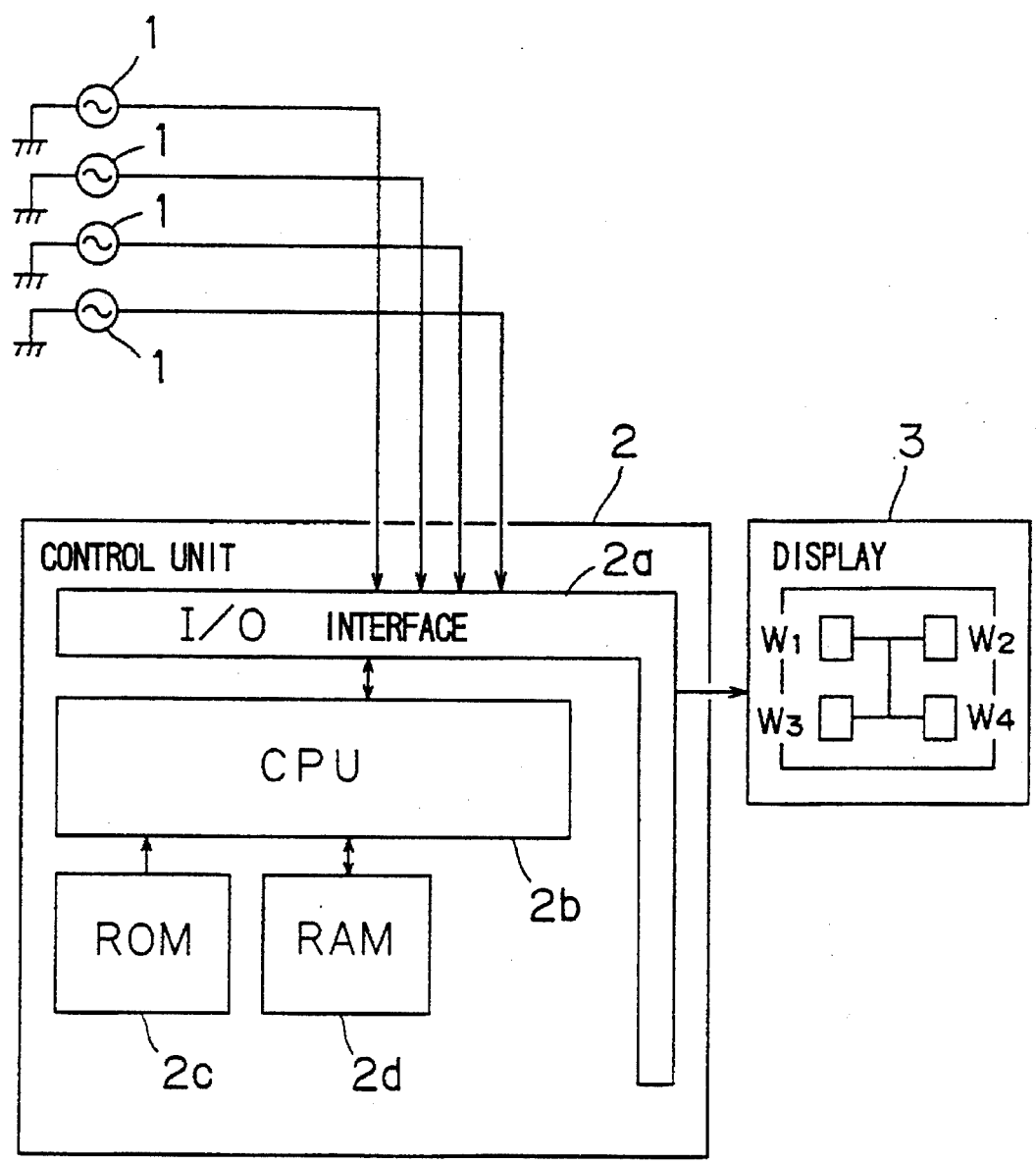
FIG. 2 is a block diagram showing the electrical construction of the tire pressure drop detecting device.

FIG. 2 is a block diagram showing the electrical construction of the tire pressure drop detecting device. The control unit 2 is composed of a microcomputer including an I/O interface $2a$ required for sending and receiving signals to and from an external device, a CPU $2b$ serving as the center of the operation processing, a ROM $2c$ in which a control operation program of the CPU $2b$ is stored, and a RAM $2d$. Data, etc. are temporarily written to, or the written data are read out from, the RAM $2d$, when the CPU $2b$ performs a control operation.

Each of the wheel speed sensors 1 generates pulse signals corresponding to the rotating speed of the corresponding tire $W_i$ (referred to as a "wheel speed pulse" hereinafter). The CPU $2b$ calculates the rotational angular velocity $F_i$ of each tire $W_i$ on the basis of the wheel speed pulses generated from the corresponding wheel speed sensor 1 for each predetermined sampling period $\Delta T$ (sec) (e.g. $\Delta T=1$).

Figure 3:
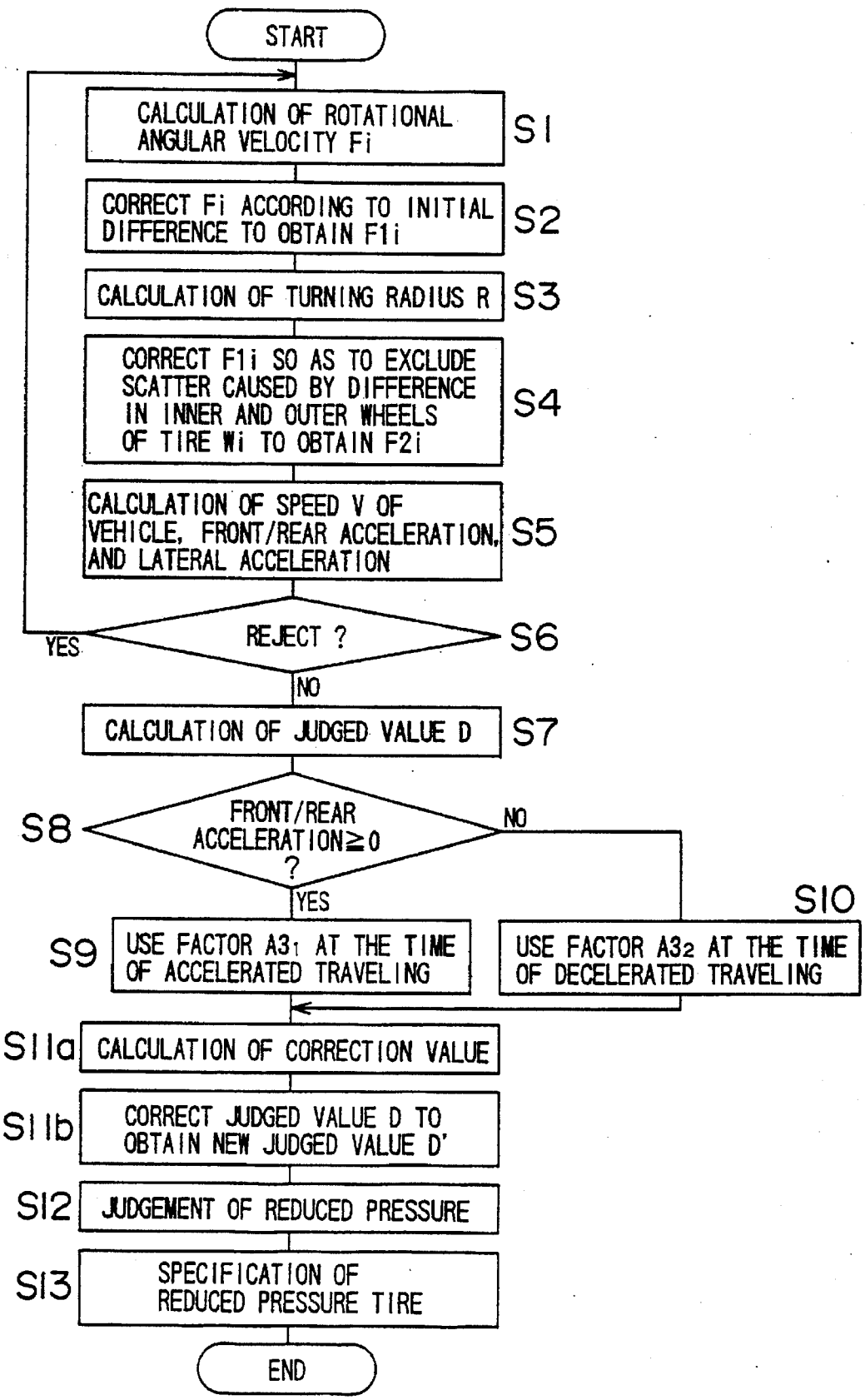
FIG. 3 is a flow chart for explaining the detection processing of the tire pressure drop in the above tire pressure drop detecting device.

FIG. 3 is a flow chart for explaining the detection process for detecting the tire pressure drop, performed in the tire pressure drop detecting device. This processing is performed by the control unit 2, while the CPU $2b$ operates according to a predetermined program stored in the ROM $2c$. In the following, explanation will be made with respect to an FF (front engine-front drive) vehicle taken as an example of a standard vehicle.

According to the tire pressure drop detection processing, the rotational angular velocity $F_i$ of each tire $W_i$ is firstly calculated on the basis of the wheel speed pulse generated from the corresponding wheel speed sensor 1 (step S1).

Variation within a specification (hereinafter referred to as an "initial difference") is permitted with respect to the tire $W_i$ at the time of time production. Therefore, the effective rolling radiuses of tires $W_i$ are not necessarily the same, even if the tires $W_i$ have a normal pneumatic pressure. Therefore, the rotational angular velocities $F_i$ of the tires $W_i$ may vary.

Once the rotational angular velocities $F_i$ have been calculated in the step S1, the calculated rotational angular velocities $F_i$ are corrected, so as to exclude variations due to the initial difference (step S2). Specifically, the corrections according to the following equations (8) to (11) are carried out, thereby obtaining corrected rotational angular velocities $F1_1$, $F1_2$, $F1_3$ and $F1_4$.

$$F1_1 = F_1 \tag{8}$$

$$F1_2 = mF_2 \tag{9}$$

$$F1_3 = F_3 \tag{10}$$

$$F1_4 = nF_4 \tag{11}$$

The correction factors m and n are, for example, determined when the vehicle is is driven for the first time, when the tire $W_i$ is filled with air or when the tire $W_i$ is replaced, and the factors m and n are stored in advance in the ROM 2c of the control unit 2. To determine the correction factors m and n, the rotational angular velocities $F_i$ are calculated under the condition that the vehicle is traveling linearly, for example. On the basis of the calculated rotational angular velocities $F_i$, the correction factors m and n can be obtained according to the following equations (12) and (13), respectively:

$$m = F_1/F_2 \tag{12}$$

$$n = F_3/F_4 \tag{13}$$

The variation of the rotational angular velocities $F_i$ of the tires $W_i$ is not caused only by the initial difference. For example, a difference in distance from the turning center between the tire $W_i$ on the inside to a corner and tire $W_i$ on outside to the corner, when the vehicle is turning at the corner, is one of the causes. Furthermore, the rotational angular velocities $F_i$ may vary due to the load movement of the vehicle.

For example, when the vehicle is turning to the left, the distances from the turning center of the tires $W_1$ and $W_3$ on the inside to the corner are relatively small, while the distances from the turning center of the tires $W_2$ and $W_4$ on the outside to the corner are relatively large. Accordingly, in order that the vehicle travels smoothly at the corner, it is necessary that the rotational angular velocities $F_1$ and $F_3$ of the tires $W_1$ and $W_3$ on the inside to the corner become relatively small, while the rotational angular velocities $F_2$ and $F_4$ of the tires $W_2$ and $W_4$ on the outside to the corner become relatively large. As a result, the rotational angular velocities $F_i$ vary with the right and left tires.

In addition, when the vehicle is turning left at a corner, as shown in FIG. 4, a lateral acceleration LA is exerted on the center of gravity 0 of the vehicle. This lateral acceleration LA is inversely proportional to the turning radius R and proportional to the square of the speed V of the vehicle, and exerted in the direction toward the outside of the corner (toward the right side of the vehicle). As a result, a partial load of the vehicle which is proportional to the lateral acceleration LA moves from the inside of the corner to the outside of the corner. Thereby, the effective rolling radiuses of the following tires $W_3$ and $W_4$ (because the explanation is made with respect to an FF vehicle in this embodiment) vary by the values represented by the following formulas:

$$(1 + p \times LA) \tag{14}$$

$$(1 - p \times LA) \tag{15}$$

where the above p is a factor proportional to the load of the vehicle. When the load of the vehicle Q is considered to be constant, this factor p can be considered to be a constant.

In such way, since the effective rolling radius of the tire $W_i$ varies depending the load movement of the vehicle, the rotational angular velocities $F_i$ vary depending on the right and left tires.

Then, as shown in the step S3, the turning radius R in which the influence of the load movement of the vehicle on the rotational angular velocities is excluded is calculated. More specifically, the speeds $V1_3$ and $V1_4$ of the following tires $W_3$ and $W_4$ are firstly calculated, on the basis of the rotational angular velocities $F1_3$ and $F1_4$ after initial correction, as shown in the following equations (16) and (17):

$$V1_3 = r \times F1_3 \tag{16}$$

$$V1_4 = r \times F1_4 \tag{17}$$

where r is a constant corresponding to the effective rolling radius at the time of linear traveling and is previously stored in the ROM 2c.

Then, the turning radius R' is calculated based on the calculated speeds $V1_3$ and $V1_4$ of the following tires $W_3$ and $W_4$, as shown in the following equation (18):

$$R' = \frac{Tw}{2} \times \frac{V1_4 + V1_3}{V1_4 - V1_3} \tag{18}$$

where Tw indicates the distance between the left and right following tires $W_3$ and $W_4$.

This calculated turning radius R' of the vehicle is subjected to the correction by which the influence of the load movement of the vehicle on the rotational angular velocities is excluded, as shown in the following equation (19):

$$R = R' \times \{u_1 + u_2(V1_3 + V1_4)^2\} \tag{19}$$

where $u_1$ and $u_2$ indicate constants which are previously stored in the ROM 2c.

The constants $u_1$ and $u_2$ are preferably set as follows:

$$u_2 = \frac{1}{9.8} \times \frac{\beta}{2\,Tw}$$

wherein $$\beta = \frac{Q \times H \times \alpha}{Tw \times 100}$$

wherein Q is a load of the vehicle, H is a height of the center of gravity of the vehicle from the ground surface of the tire, and $\alpha$ is a change rate (%) of the effective rolling radius of the tire to the load.

Then, the rotational angular velocities $F1_i$ determined in the above step S2 are corrected, on the basis of the determined turning radius R of the vehicle, so as to exclude variations caused by the difference in distance between the tires $W_i$ and turning center (step S4). Specifically, the rotational angular velocities $F2_1$ to $F2_4$ after correction are corrected according to the following equations (20) to (23):

$$F2_1 = \frac{|R|}{\sqrt{(R - Tw/2)^2 + WB^2}} \times F1_1 \tag{20}$$

$$F2_2 = \frac{|R|}{\sqrt{(R + Tw/2)^2 + WB^2}} \times F1_2 \tag{21}$$

$$F2_3 = \frac{|R|}{|R - Tw/2|} \times F1_3 \tag{22}$$

$$F2_4 = \frac{|R|}{|R + Tw/2|} \times F1_4 \tag{23}$$

Thereby, rotating angular velocities $F2_i$ in which variations caused by the difference in distance from the turning center between the tire $W_i$ on the inside to the corner and tire $W_i$ on the outside to the corner (difference in inner and outer wheels) is excluded can be obtained.

In the above equations (20) to (23), WB indicates a wheel base of the vehicle.

In addition, the correction according to the above equations (20) to (23) obtained by is a processing performed on the assumption that the vehicle is an FF vehicle, as described above. If the vehicle is an FR (front engine-rear drive)

vehicle, the correction is performed according to the following equations (24) to (27).

$$F2_1 = \frac{|R|}{|R - Tw/2|} \times F1_1 \qquad (24)$$

$$F2_2 = \frac{|R|}{|R + Tw/2|} \times F1_2 \qquad (25)$$

$$F2_3 = \frac{|R|}{\sqrt{(R - Tw/2)^2 + WB^2}} \times F1_3 \qquad (26)$$

$$F2_4 = \frac{|R|}{\sqrt{(R + Tw/2)^2 + WB^2}} \times F1_4 \qquad (27)$$

The rotational angular velocities $F_i$ sometimes contain an error depending on the turning radius R of the vehicle, speed V of the vehicle, lateral acceleration LA of the vehicle and magnitude of front/rear acceleration $FRA_i$ of each tire $W_i$.

That is, when the turning radius R of the vehicle is relatively small, the tires $W_i$ are likely to cause a lateral slip and, therefore, there is a substantial possibility that the rotational angular velocities $F_i$ calculated contain an error. In addition, when the speed V of the vehicle is considerably low, the detection precision of the wheel speed sensors 1 becomes considerably inferior. Therefore, there is a substantial possibility that the calculated rotational angular velocities $F_i$ contain an error. Furthermore, when the lateral acceleration LA of the vehicle is comparatively large, the tires $W_i$ are likely to cause a lateral slip and, therefore, there is a substantial possibility that the calculated rotational angular velocities $F_i$ contain an error. Furthermore, when the front/rear acceleration $FRA_i$ of each tire $W_i$ is relatively large, for example, the influence of the slip due to rapid acceleration/deceleration of the vehicle or the influence of the foot breaking of the tire $W_i$ will be considered. Therefore, there is a substantial possibility that the calculated rotational angular velocities $F_i$ contain an error.

In such cases where there is a substantial possibility that the rotational angular velocities $F_i$ contain an error, it is preferred to reject (eliminate) the rotational angular velocities $F_i$ from the detection of the pressure drop.

Then, the speed V of the vehicle, lateral acceleration LA and front/rear acceleration $FRA_i$ of each tire $W_i$ are calculated (step S5). More specifically, the speed V of the vehicle is calculated on the basis of the speed $V2_i$ of each tire $W_i$. The speed $V2_i$ of each tire $W_i$ is calculated according to the following equation (28). In the following equation (28), r is a predetermined static load radius of the tire $W_i$ and is stored in advance in the ROM 2c. The static load radius is a distance from the tire center to the ground surface when loading on the tire with the tire at rest.

$$V2_i = r \times F2_i \qquad (28)$$

The speed V of the vehicle is calculated, on the basis of the calculated speed $V2_i$ of each tire $W_i$, according to the following equation (29):

$$V2 = (V2_1 + V2_2 + V2_3 + V2_4)/4 \qquad (29)$$

On the other hand, the lateral acceleration LA of the vehicle is calculated by utilizing this calculated speed V of the vehicle according to the following equation (30):

$$LA = V^2/(R \times 9.8) \qquad (30)$$

In addition, the front/rear acceleration $FRA_i$ of each tire $W_i$ is calculated according to the following equation (31) which assumes that the speed of each tire $W_i$ calculated in the sampling period before one period be $BV2_i$. The numeral 9.8 is inserted in the denominator in the following equation (31) so as to subject the front/rear acceleration $FRA_i$ of each tire $W_i$ to gravity acceleration conversion.

$$FRA_i = (V2_i - BV2_i)/(\Delta T \times 9.8) \qquad (31)$$

The above speed V of the vehicle, lateral acceleration LA and front/rear acceleration $FRA_i$ of each tire $W_i$ may be determined by directly detecting them using respective sensors.

On the basis of the turning radius R of the vehicle, speed V of the vehicle, front/rear acceleration $FRA_i$ of each tire $W_i$ and lateral acceleration LA of the vehicle, it is judged whether the rotational angular velocities $F_i$ calculated in the concerned sampling period are rejected (eliminated) or not (step S6). Specifically, the rotational angular velocities $F_i$ are rejected if at least one of the following four conditions is satisfied:

(a) $R < R_{TH}$ (e.g. $R_{TH} = 30$ m)

(b) $V < V_{TH}$ (e.g. $V_{TH} = 10$ km/h)

(c) $MAX\{|FRA_i|\} > A_{TH}$ (e.g. $A_{TH} = 0.1$ g: g $= 9.8$ m/sec$^2$)

(d) $LA > G_{TH}$ (e.g. $G_{TH} = 0.4$ g)

As a result of the judgment in the above step S6, if the rotational angular velocities $F_i$ are not rejected, the judged value D is calculated, on the basis of the rotational angular velocity $F2_i$ obtained in the above step S4, according to the following equation (32) (step S7):

$$D = \frac{\dfrac{F2_1 + F2_4}{2} - \dfrac{F2_2 + F2_3}{2}}{\dfrac{F2_1 + F2_2 + F2_3 + F2_4}{4}} \qquad (32)$$

By the way, in the calculation of the speed of the vehicle, lateral acceleration LA and front/rear acceleration $FRA_i$ of each tire $W_i$ in the step S5, the rotational angular velocities $F2_i$ which have been corrected according to the initial difference and difference in inner and outer wheels of the tires $W_i$ are used. On the other hand, the effective rolling radius of the tire $W_i$ depends on not only the initial difference and difference in the inner and outer wheels, but also the turning radius R of the vehicle and its, speed V, lateral acceleration LA and front/rear acceleration $FRA_i$. Accordingly, the influence of variable factors including the turning radius R of the vehicle, speed V, lateral acceleration LA and front/rear acceleration $FRA_i$ is contained in the judged value D determined in the step S7.

Thus, a factor $A3_1$ or $A3_2$ (hereinafter referred to as a "factor A3"), corresponding to the fact that the vehicle is traveling with increasing speed or traveling with decreasing speed, is firstly selected (steps S8, S9 and S10). Then, by utilizing this selected factor A3, the correction for excluding the influence of variable factors such as the turning radius R of the vehicle, speed V, lateral acceleration LA and front/rear acceleration $FRA_i$ on the judged value D is carried out (step S11a and S11b). Specifically, a correction value C1 is determined by the following equation (33) (step S11a), and the judged value D is then corrected according to the following equation (34) to determine the judged value D' after correction (step S11b). In the following equation (33), FRA is an average value of the front/rear accelerations $FRA_i$ of four tires.

$$C1 = \frac{LA \times (A1 + A2 \times V^2 + A3 \times FRA)}{|R|} \quad (33)$$

$$D' = D - C1 \quad (34)$$

In the above formula (33), A1, A2 and A3 respectively indicate factors which are previously stored in the ROM $2c$. When it has already been known that each tire $W_i$ has a normal internal pressure, a test drive is carried out to calculate the speed V of the vehicle, front/rear acceleration FRA of the vehicle, lateral acceleration of the vehicle and turning radius R, and the factors A1, A2 and A3 are previously determined based on them.

Next, a method of determining the factors A1, A2 and A3 will be explained.

(1) Method of determining factors A1 and A2

At the time of the above test drive, the vehicle is allowed to travel at constant speed (various speeds) on a curve. At this time, a judged value X is determined from the following equation (35).

$$X = D \times |R|/LA \quad (35)$$

A relationship between this judged value X and speed V of the vehicle is then obtained. Specifically, there can be made a graph in which the judged value X and speed V of the vehicle are respectively plotted on the ordinate and abscissa. Then, the following equation (36) is solved by applying the method of least squares to the drawn graph.

$$X = \alpha V^2 + \beta \quad (36)$$

In this equation (36), β and α correspond to A1 and A2, respectively.

(2) Method of determining factor A3

At the time of the above test drive, the vehicle is allowed to travel with accelerated or decelerated speed (at a certain range of front/rear acceleration FRA). At this time, a judged value Y is determined from the following equation (37).

$$Y = D - (A1 + A2 \times V^2) \times LA/|R| \quad (37)$$

wherein A1 and A2 are obtained by the method of the above item (1).

A relationship between this judged value Y and variable value S (=LA×FRA/|R|) is then determined. More specifically, a graph is drawn by respectively plotting the judged value Y and variable value S of the vehicle the ordinate and abscissa. Then, the following equation (38) is solved by applying the method of least squares for the drawn graph.

$$X = \gamma V^2 + \delta \quad (38)$$

In this equation (38), γ corresponds to A3. δ varies according to whether the vehicle is traveling with accelerated speed (accelerating) or traveling with decelerated speed (decelerating).

Figure 5A:
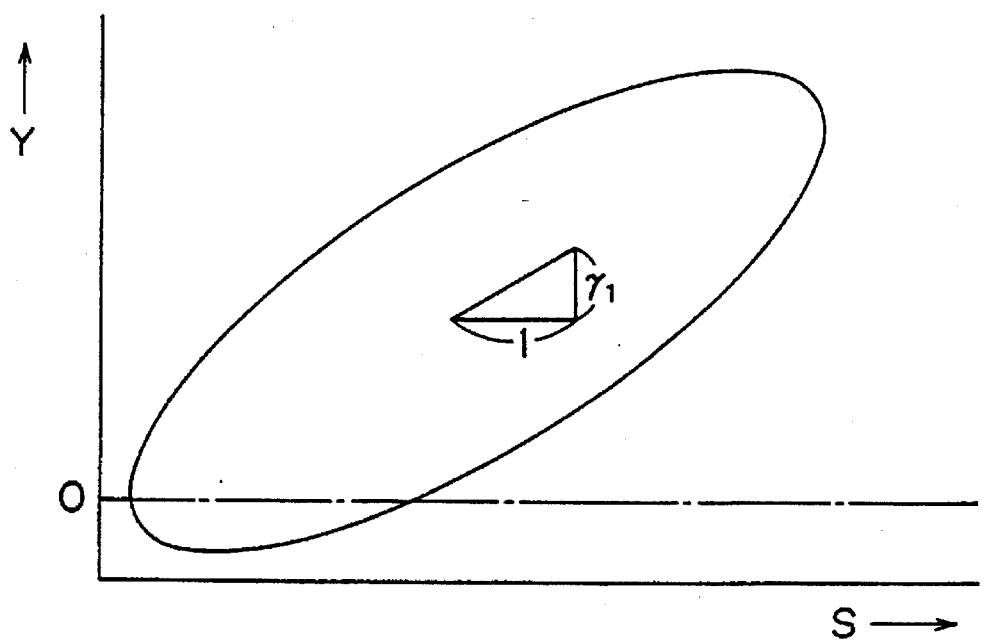
FIGS. 5A and 5B are graphs for explaining the fact that one of factors for calculating the corrected value varies from case to case, i.e. accelerated traveling or decelerated traveling.
Figure 5B:
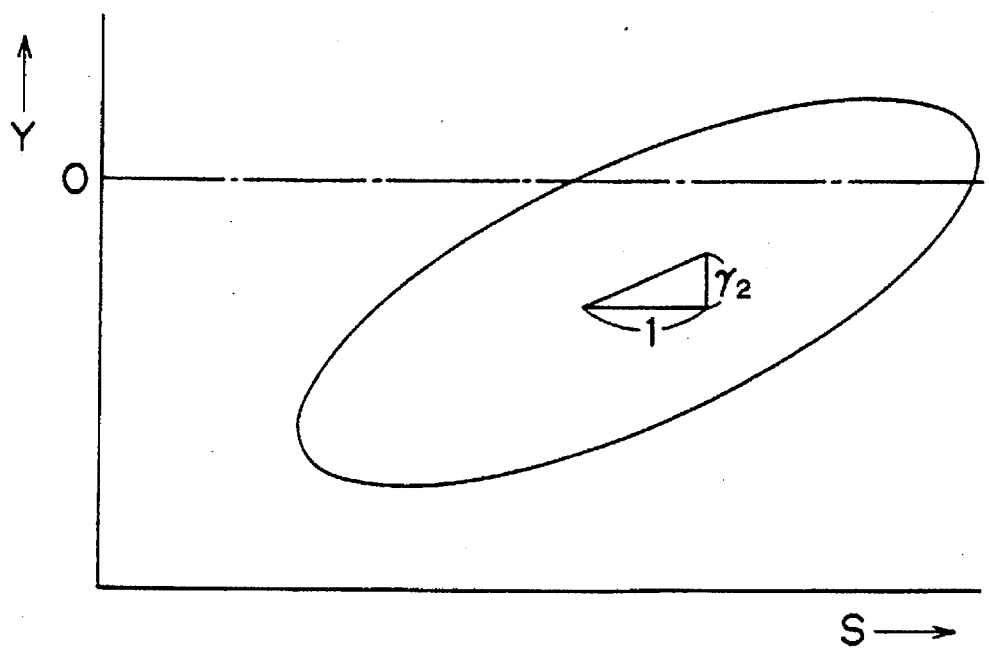

FIG. 5A is a Y-S graph corresponding to observed values at the time of acceleration, and FIG. 5B is a Y-S graph corresponding to observed values at the time of deceleration. The observed values are distributed within a range having a generally elliptical shape in the Y-S graph. According to FIG. 5A and FIG. 5B, γ corresponding to the slope of the Y-S graph is $\gamma_1$ at the time of acceleration, and it is $\gamma_2$ at the time of deceleration. That is, the value of γ varies from case to case, e.g. accelerated traveling or decelerated traveling. Accordingly, as shown in the above steps S8, S9 and S10, if the first constant $A3_1$ or the second constant $A3_2$ is selected as the factor A3 depending on whether the vehicle is traveling with increasing speed or traveling with decreasing speed, and then applied, the judged value D can be subjected to the correction which is suitable for practical use.

The factors A1, A2 and A3, which have been obtained as described above, are stored in advance in the ROM $2c$ of the control unit 2.

The reason why the judged value D' obtained by the processing of the above step S11b and S11a is a judged value in which the influence of the variable factor is excluded, will be described hereinafter.

Returning to FIG. 3, it is judged whether the pneumatic pressure drops or not, by using the judged value D' after correction, obtained in the above step S11b, and applying the condition of the following expression (39) (step S12). In the following expression (39), for example, $D_{TH1} = D_{TH2} = 0.1$.

$$D' < -D_{TH1} \text{ or } D' > D_{TH2} \quad (39)$$

Figure 6:
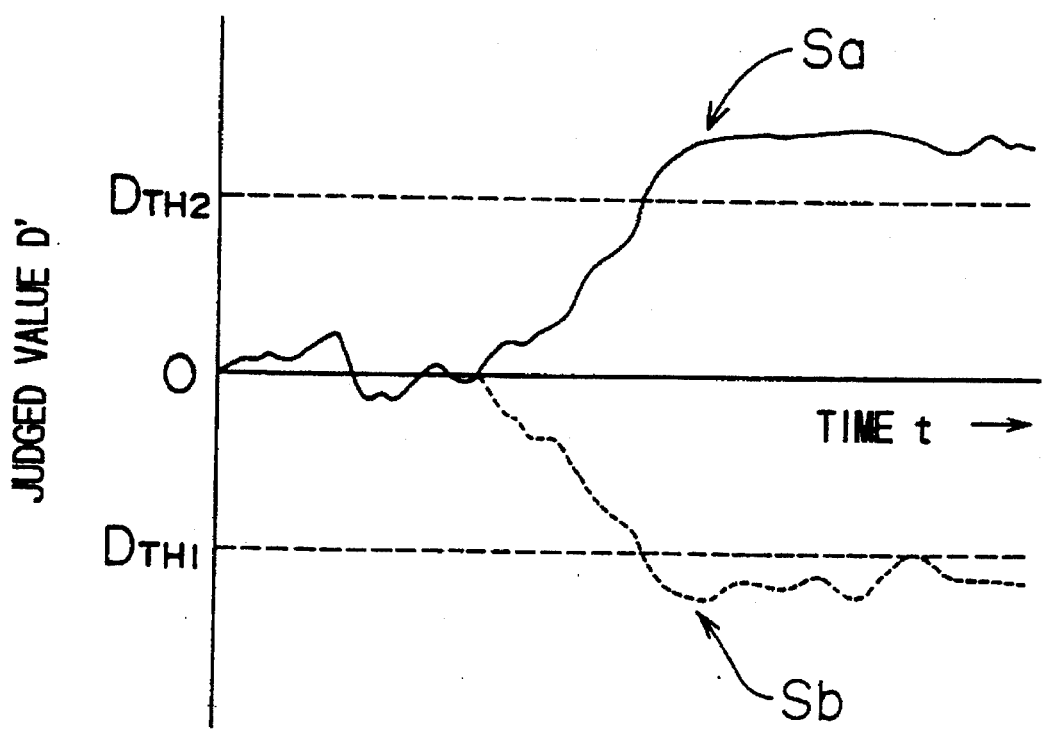
FIG. 6 is a graph for explaining the method of judging of the tire pressure drop.
Figure 7:
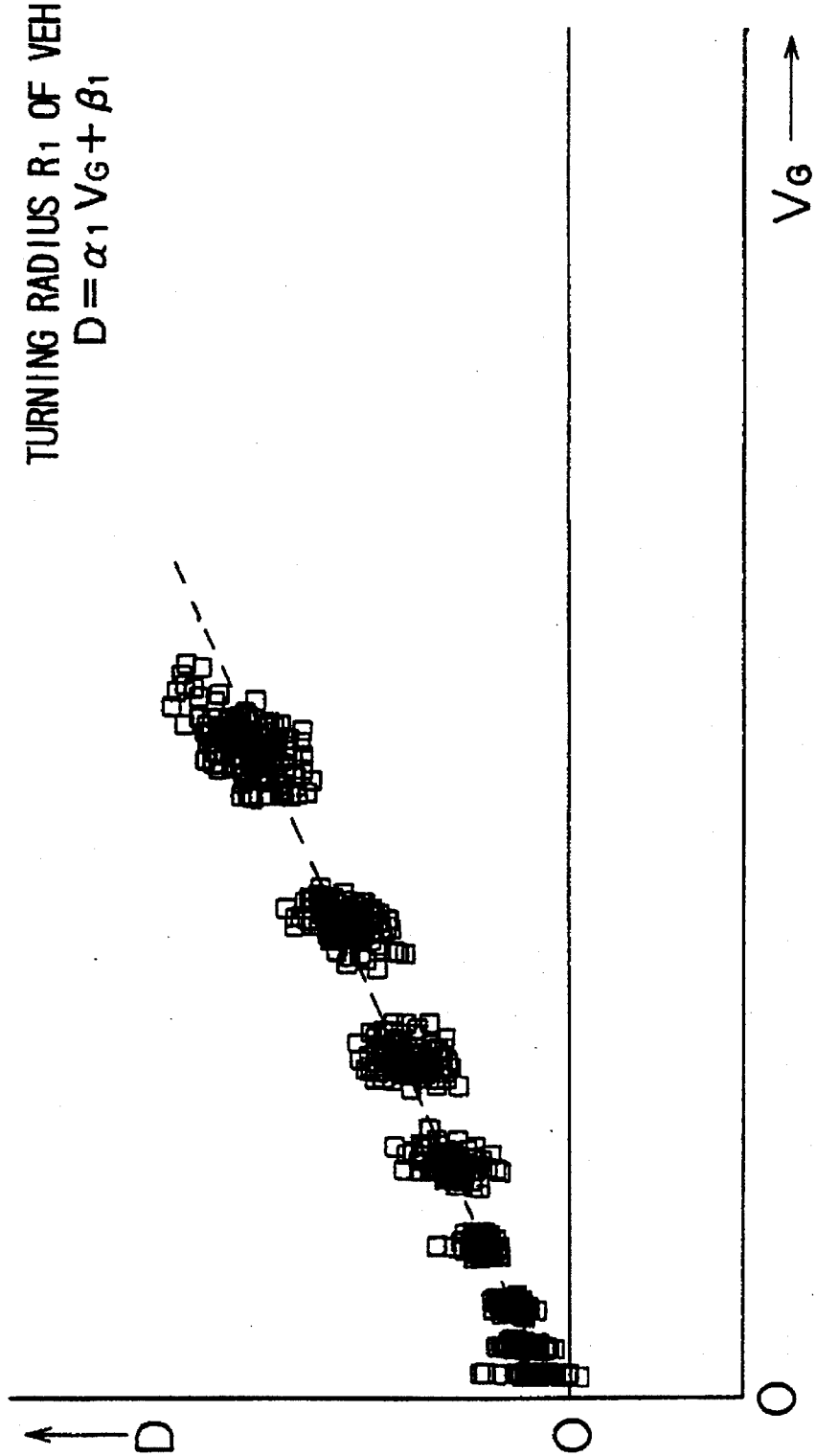
FIGS. 7, 8 and 9 are graphs for explaining the fact that a factor for calculating the corrected value depends on the turning radius of the vehicle.
Figure 8:
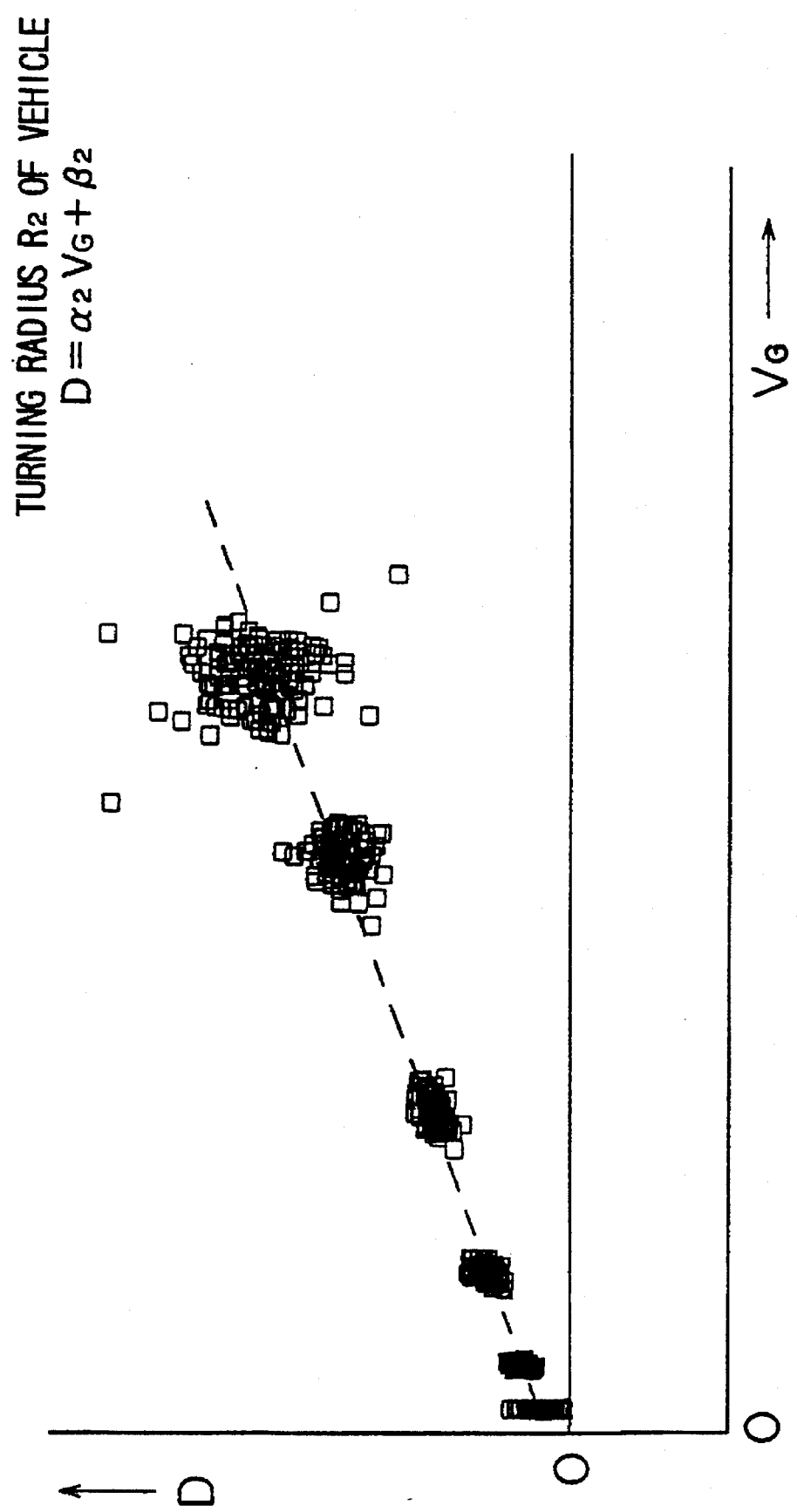
Figure 9:
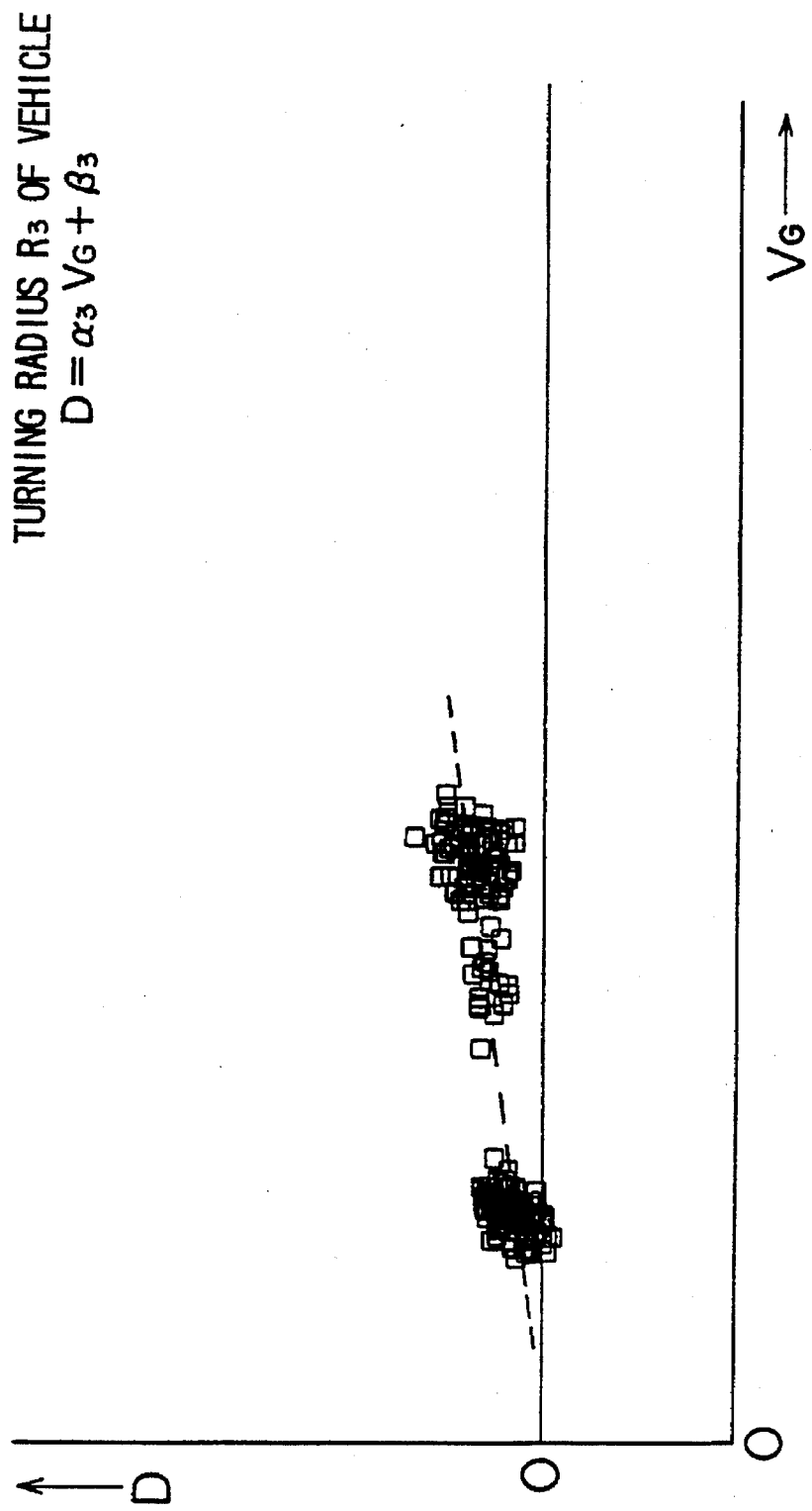
Figure 10:
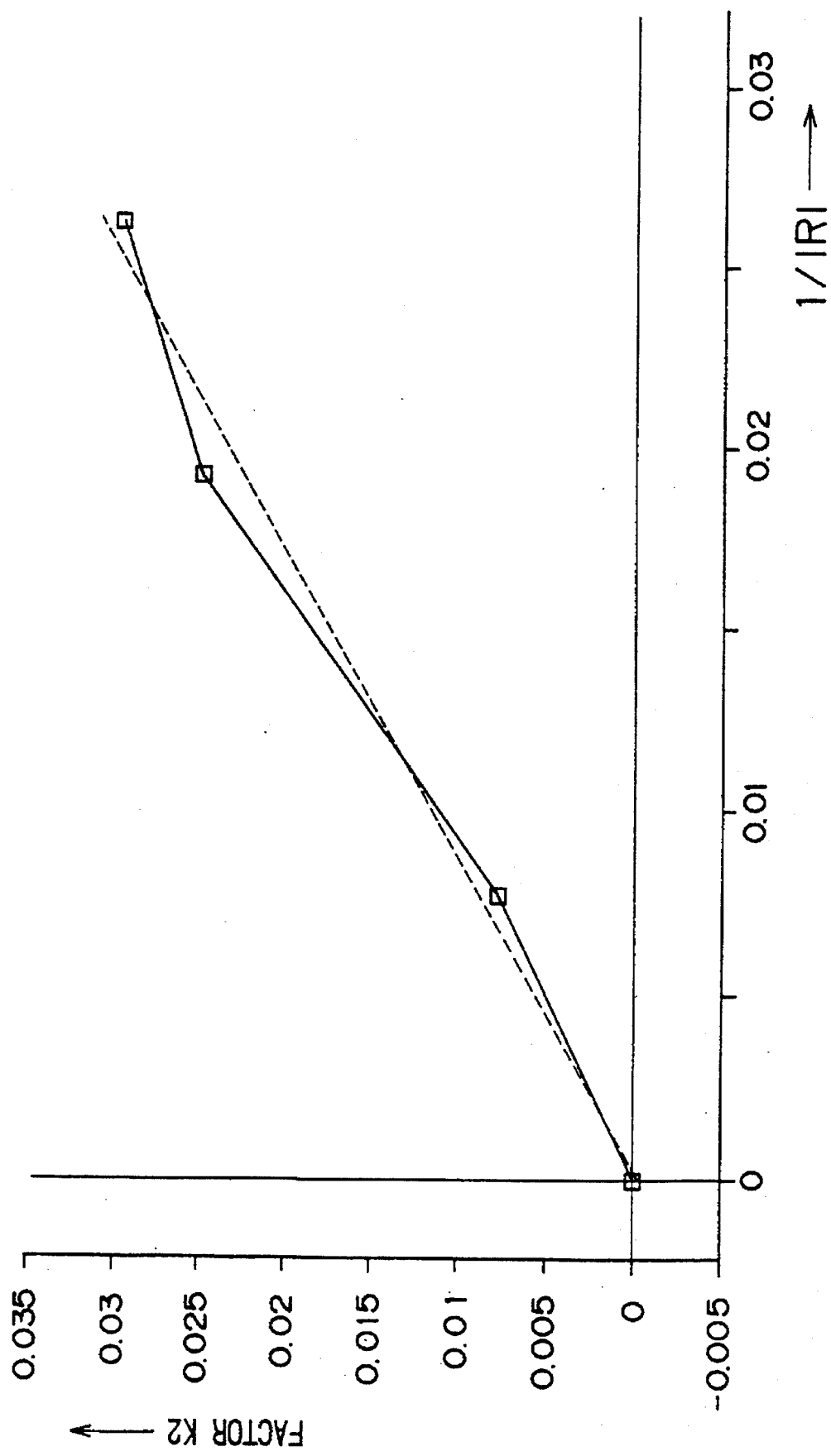
FIG. 10 is a graph showing a change of one of factors for calculating the corrected value with respect to the turning radius of the vehicle.

If the judged value D' deviates from the range between $-D_{TH1}$ and $D_{TH2}$ as shown by the symbols Sa and Sb in FIG. 6, that is, it satisfies the condition of the above equation (39), it is judged that the pneumatic pressure of at least one tire has dropped. On the other hand, when the above judged value D' is within the range between $-D_{TH1}$ and $D_{TH2}$, that is, it does not satisfy the condition of the above equation (39), it is judged that there is no tire whose pneumatic pressure has dropped.

As described above, it is detected whether the pneumatic pressure of the tire $W_i$ drops or not while driving the vehicle. It becomes more convenient for the driver to be informed of which tire's pneumatic pressure has dropped than to merely be informed of the fact that the pneumatic pressure of any of four tires has dropped. Then, the tire $W_i$ whose pneumatic pressure has dropped is specified (step S13).

By using the judged value D' obtained according to the above equation (34), it is possible to specify that:

the reduced pressure tire is $W_1$ or $W_4$ if D'>0, and the reduced pressure tire is $W_2$ or $W_3$ if D'<0.

Furthermore, in the above case, if the vehicle is traveling linearly, it is possible to specify that:

the reduced pressure tire is $W_1$ if $F2_1 > F2_2$, the reduced pressure tire is $W_2$ if $F2_1 < F2_2$, the reduced pressure tire is $W_3$ if $F2_3 > F2_4$, and the reduced pressure tire is $W_4$ if $F2_3 < F2_4$.

Once the tire $W_i$ whose pneumatic pressure drops has been specified, the results are outputted to the indicator 3 for display. For example, as shown in FIG. 2, the indicator 3 is provided with indicating lamps corresponding to the four tires $W_1$, $W_2$, $W_3$ and $W_4$, respectively. When it is detected that the pneumatic pressure of any tire drops, the indicating lamp corresponding to the reduced pressure tire is turned on.

Next, it will be shown that the judged value D' obtained in the above step S11b is the judged value in which the influence of the variable factors is excluded. This fact is equivalent to the fact that the correction value C1 to be subtracted from the corrected value D before correction is the same as a variable component ΔD of the judged value D due to the influence of the variable factors. Thus, it will be shown below that the variable component ΔD of the judged value D equals to the above correction value C1.

When the vehicle is turning at a corner, the lateral acceleration LA acts on the vehicle, as described above. As a result, the load of the vehicle moves toward the outside of the corner and, therefore, the load exerted on the tire $W_i$ on the inside relative to the corner becomes relatively small, and the load exerted on the tire $W_i$ on the outside to the corner becomes relatively large. Accordingly, as the effective rolling radius of the tire $W_i$ on the inside becomes relatively large, and the effective rolling radius on the outside becomes relatively. Therefore, the rotational angular velocity $F_i$ of the tire $W_i$ on the inside is different from the rotational angular velocity $F_i$ of the tire $W_i$ on the outside.

However, the variable amount of the rotational angular velocity $F_i$ of the front tire $W_i$, due to the above load movement, is almost the same as that of the rotational angular velocity $F_i$ of the rear tire $W_i$. Accordingly, referring to the above equation (32) for determining the judged value D, it is understood that the change in the judged value D caused by the load movement of the vehicle is not required to be taken into consideration.

On the other hand, when the lateral acceleration LA acts on the vehicle, the ground area, the area in contact with the ground, of the tire $W_i$ on the inside relative to the corner becomes relatively small, and the ground area of the tire $W_i$ on the outside relative to the corner becomes relatively large. In addition, a driving force generated by the engine is supplied through a differential gear approximately to the tire $W_i$ on the inside and the tire $W_i$ on the outside. Accordingly, since the present explanation is made with respect to an FF vehicle in this embodiment, a slip rate Rs of the driven tire $W_1$ becomes relatively large, and a slip rate Rs of another driven tire $W_2$ becomes relatively small. As a result, the rotational angular velocity $F_i$ of the tire $W_i$ on the inside becomes large large, and the rotational angular velocity $F_i$ of the tire $W_i$ on the outside becomes relatively small. Therefore, the judged value D to be calculated varies.

In such way, the judged value D varies proportionally to the slip rate Rs of the tire $W_i$. Accordingly, a relationship between the variable component ΔD of the judged value D and variable component ΔRs of the slip rate Rs can be represented by the following equation. In the following equation (40), a is a proportionality factor.

$$\Delta D = a\Delta Rs \quad (40)$$

In addition, the change in ground area of the tire $W_i$ as a factor of the change in slip rate Rs is proportional to the magnitude of the load movement of the vehicle corresponding to the lateral acceleration LA. Accordingly, if the proportionality factor is b, the above equation (40) can be modified into the following equation (41):

$$\Delta D = a \times b \times LA = c \times LA \quad (41)$$

where $$c = a \times b.$$

In addition, the change in ground area of the tire $W_i$ as a factor of the change in slip rate Rs, is inversely proportional to the magnitude of the turning radius R of the vehicle. Accordingly, the variable component ΔRs of the slip rate Rs is inversely proportional to the absolute value of the turning radius R. Therefore, if the proportionality factor is d, the above equation (41) can be modified into the following equation (42):

$$\Delta D = c \times d \times LA \times (1/|R|) = e \times (LA/|R|) \quad (42)$$

where $$e = c \times d.$$

In addition, the slip rate Rs is represented by the following equation (43) until the tire $W_i$ reaches a grip limitation.

$$Rs = \frac{2F_x}{C_x \times W_D \times L^2} \quad (43)$$

In the above equation (43), $F_x$ is a driving force (damping force), $C_x$ is a front/rear shear elastic modulus per unit area of a rubber constituting the tire $W_i$, $W_D$ is a width of the ground surface of the tire $W_i$ and L is a length of the ground surface of the tire $W_i$.

The above driving force $F_x$ is represented, more specifically, by the following equation (44):

$$F_x = \text{(rolling resistance)} + \text{(air resistance)} + \text{(acceleration resistance)} = f + g \times V^2 \times FRA \quad (44)$$

Referring to the above equation (43), it is understood that the slip rate Rs is proportional to the driving force $F_x$. Accordingly, the variable component ΔRs of the slip rate Rs is proportional to the driving force $F_x$. Therefore, if the proportionality factor is i, the above equation (42) can be modified into the following equation (45):

$$\begin{aligned}\Delta D &= e \times (LA/|R|) \times i \times (f + g \times V^2 + h \times FRA) \\ &= \frac{LA}{|R|} \times \{(e \times i \times f) + (e \times i \times g) \times \\ & \quad V^2 + (e \times i \times h) \times FRA\} \\ &= \frac{LA \times (A1 + A2 \times V^2 + A3 \times FRA)}{|R|}\end{aligned} \quad (45)$$

In the above equation (45), $A1 = e \times i \times f$, $A2 = e \times i \times g$, and $A3 = e \times i \times h$.

The variable component ΔD of the judged value D represented by the above equation (45), has the same form as that of the correction value C1 of the above equation (33). Thereby, it has been shown that the variable component ΔD of the judged value D equals the correction value C1.

As described above, according to the tire pressure drop detecting device of this embodiment, the influence of the turning radius R of the vehicle is exerted on all terms of the correction value C1. Therefore, the judged value D can be subjected to the correction by which variation of the rotational angular velocities $F_i$, depending on the turning radius R of the vehicle, is absorbed. Accordingly, the judged value D', in which the influence of the turning radius R of the vehicle is nearly completely excluded, can be obtained. Therefore, it can be accurately detected whether the pneumatic pressure of any particular tire $W_i$ drops or not. Accordingly, the safety at the time of operating the vehicle can be improved.

The embodiment of the present invention is as described above, but the present invention is not limited thereto. For example, in the above embodiment, the corrected value D is corrected using the correction value C1 determined by the above equation (33), but the judged value D may be corrected, for example, by using the correction value C2 determined by the following equation (46) in place of the correction value C1.

$$C2 = \frac{LA \times (B1 + B2 \times V + B3 \times FRA)}{|R|} \quad (46)$$

In the equation (46), B1, B2 and B3 indicate factors. When using the correction value C2, a first factor $B3_1$ is used as the factor B3 at the time of acceleration of the vehicle (step S9), and a second factor $B3_2$ is used as the factor B3 at the time of the deceleration of the vehicle (step S10), on the basis of the judgment of the step S8 of FIG. 3. These factors B1, B2 and B3 are determined as follows. That is, when it is already known that any tire $W_i$ has a normal internal pressure, a test drive is carried out at various speeds on a curve. At this time, a judged value X is determined. A graph is drawn by respectively plotting the judged value X and speed V of the vehicle on the ordinate and abscissa. Then, the following equation (47) is obtained by applying the method of least squares to the drawn graph.

$$X = \epsilon V + \zeta \tag{47}$$

In this equation (47), $\zeta$ and $\epsilon$ correspond to B1 and B2, respectively.

In addition, when it is already known that any tire $W_i$ has a normal internal pressure, the vehicle is accelerated and decelerated in a certain range of the front/rear acceleration FRA. At this time, a judged value $Y(=D-(B1+B2\times V)\times LA/|R|)$ is determined. A graph is drawn by respectively plotting the judged value Y and variable value S ($=LA\times FRA/|R|$) of the vehicle on the ordinate and abscissa. Then, the following equation (48) is obtained by applying the method of least squares to the drawn graph.

$$Y = \eta S + \theta \tag{48}$$

In this equation (48), $\eta$ corresponds to B3.

By using the correction value C2 thus determined, the judged value D is corrected according to the following equation (49), thereby determining the judged value D' after correction.

$$D' = D - C2 \tag{49}$$

Thereby, the influence of the initial difference generated at the time that the tires $W_i$ are produced can be effectively excluded from the judged value D. The reason will be explained below.

In the above embodiment, the treatment for removing the initial difference from the rotational angular velocities $F_i$ is carried out before the judged value D is corrected according to the above equation (34). However, the above initial difference is actually not completely excluded. Therefore, the influence of the initial difference is also exerted on the judged value D. The correction value C1 contains a term representing the lateral acceleration LA multiplied by the square of the speed V, as in the above equation (33). In addition, the lateral acceleration LA is proportional to the square of the speed, as is apparent from the above equation (30). Accordingly, the corrected value C actually contains a term which is a fourth power of the speed V. Therefore, if the initial difference is not excluded completely, its influence is enhanced in proportional to the fourth power.

Thus, in the correction value C2 determined according to the equation (46), the exponent of the speed V of the vehicle is reduced by 1. Thereby, the influence of the initial difference can be effectively excluded.

In addition, the rolling resistance of the first term of the above equation (44) varies proportionally to the speed V of the vehicle. Therefore, a correction value C3 determined according to the following equation (50) may be used in place of the above correction value C1.

$$C3 = \frac{LA \times (E1 \times V + E2 \times FRA)}{|R|} \tag{50}$$

In this equation (50), E1 and E2 indicate factors. Among them, the factor E1 is the same value as that of the above factor B2. In addition, the factor E2 is determined as follows. That is, when it is already known that any tire $W_i$ has a normal internal pressure, acceleration and deceleration of the vehicle are carried out in a certain range of the front/rear acceleration FRA. Specifically, a judged value Y ($=D-E1\times V\times LA/|R|$) is determined at the times of an acceleration and deceleration. A graph is drawn by respectively plotting the judged value Y and variable value S ($=LA\times FRA/|R|$) on coordinate and abscissa. Then, the following equation (51) is obtained by applying the method of least squares to the drawn graph.

$$Y = \iota S + \kappa \tag{51}$$

In this equation (51), $\iota$ corresponds to E2.

When using the corrected value C3, a first factor $E2_1$ is used as the factor E2 at the time of acceleration (step S9), and a second factor $E2_2$ is used as the factor E2 at the time of the deceleration (step S10), on the basis of the judgment of the step S8 of FIG. 3.

The embodiments of the present invention have been described in detail, hereinabove, but the description should be considered as illustrative and not restrictive, the spirit and scope of the present invention being limited only by the appended claims.

What is claimed is:

1. A method of determining a pneumatic pressure drop of a tire provided for a vehicle, comprising the steps of:
    determining a rotational angular velocity of a tire,
    determining a judged value D based on the determined rotational angular velocity;
    substituting a velocity V of the vehicle, a front/rear acceleration FRA of the vehicle, a lateral acceleration LA of the vehicle and a turning radius R of the vehicle into a predetermined polynominal expression to determine a correction value, the predetermined polynominal expression being defined so that an influence of the turning radius R is exerted on all terms;
    determining a judged value D' after correction by correcting the judged value D using the correction value; and
    judging whether a tire pressure drops or not, based on the judged value D' after correction.

2. A method according to claim 1, wherein the predetermined polynominal expression is the following equation (A) for determining a correction value C1:

$$C1 = \frac{LA\ (A1 + A2 \times V^2 + A3 \times FRA)}{|R|} \tag{A}$$

wherein A1, A2 and A3 indicate constants.

3. A method according to claim 1, wherein the predetermined polynominal expression is the following equation (B) for determining a correction value C2:

$$C2 = \frac{LA\ (B1 + B2 \times V + B3 \times FRA)}{|R|} \tag{B}$$

wherein B1, B2 and B3 indicate constants.

4. A method according to claim 1, wherein the predetermined polynominal expression is the following equation (C) for determining a correction value C3:

$$C3 = \frac{LA\ (E1 \times V + E2 \times FRA)}{|R|} \tag{C}$$

wherein E1 and B2 indicate constants.

5. A method according to claim 1, wherein the predetermined polynominal expression has a term containing the front/rear acceleration of the vehicle,
    the method further comprising the steps of
    judging whether the vehicle is traveling with accelerated speed or traveling with decelerated speed, based on the front/rear acceleration of the vehicle,
    applying a first constant as a factor of the term including the front/rear acceleration when the vehicle is traveling with accelerated speed, and applying a second constant as the factor of the term including the front/rear acceleration when the vehicle is traveling with decelerated speed.

6. A method according to claim 1, wherein the vehicle is a four-wheel vehicle provided with four tires,
wherein the step of determining the rotational angular velocity of a tire includes determining rotational angular velocities $F2_1$, $F2_2$, $F2_3$ and $F2_4$ of the four tires, and
wherein the step of determining the judged value D includes substituting the rotational angular velocities $F2_1$, $F2_2$, $F2_3$ and $F2_4$ of the four tires into the following equation to determine the judged value D:

$$D = \frac{\frac{F2_1 + F2_4}{2} - \frac{F2_2 + F2_3}{2}}{\frac{F2_1 + F2_2 + F2_3 + F2_4}{4}}.$$

7. A method according to claim 1, wherein the vehicle is a four-wheel vehicle provided with four tires, and
wherein the step of determining the rotational angular velocity of a tire includes the steps of:
calculating rotational angular velocities $F_1$, $F_2$, $F_3$ and $F_4$ of the four tires based on output signals of wheel speed sensors,
correcting the rotational angular velocities $F_1$, $F_2$, $F_3$ and $F_4$ to calculate rotational angular velocities $F1_1$, $F1_2$, $F1_3$ and $F1_4$ in which an initial difference is corrected, and
further correcting the rotational angular velocities $F1_1$, $F1_2$, $F1_3$ and $F1_4$ in which the initial difference is corrected, to calculate rotational angular velocities $F2_1$, $F2_2$, $F2_3$ and $F2_4$ in which variations caused by a difference in distance from a turning center of the vehicle to the respective tires are excluded.

8. A method according to claim 1, wherein the vehicle is a four-wheel vehicle provided with four tires, and
wherein the step of determining the rotational angular velocity of a tire includes determining rotational angular velocities $F2_1$, $F2_2$, $F2_3$ and $F2_4$ of the four tires,
the method further comprising a step of determining a speed of the vehicle V, a front/rear acceleration FRA of the vehicle and a lateral acceleration LA of the vehicle, based on rotational angular velocities $F2_1$, $F2_2$, $F2_3$ and $F2_4$ of the four tires.

9. A method according to claim 1, further comprising a step of determining a turning radius R, wherein an influence of a load movement of the vehicle is excluded.

10. A method according to claim 1, wherein the step of determining the judged value D' after correction includes subtracting the correction value from the judged value D before correction.

11. A method according to claim 1, wherein the step of judging whether the tire pressure drops or not includes a step of judging that a reduced pressure tire is not present if the judged value D' after correction is within a predetermined range and that a reduced pressure tire is present if the judged value D' after correction is not within the predetermined range.

12. A device for determining a pneumatic pressure drop of a tire provided for a vehicle, comprising:
rotational angular velocity operating means for determining a rotational angular velocity of a tire;
judged value operating means for determining a judged value D based on the determined rotational angular velocity;
correction value operating means for substituting a velocity V of the vehicle, a front/rear acceleration FRA of the vehicle, a lateral acceleration LA of the vehicle and a turning radius of the vehicle into a predetermined polynominal expression to determine a correction value, the predetermined polynominal expression being defined so that an influence of the turning radius R is exerted on all terms;
judged value correcting means for determining a judged value D' after correction by correcting the judged value D using the correction value; and
reduced pressure judging means for judging whether a tire pressure drops or not, based on the judged value D' after correction.

13. A device according to claim 12, wherein the predetermined polynominal expression is the following equation (A) for determining a correction value C1:

$$C1 = \frac{LA(A1 + A2 \times V^2 + A3 \times FRA)}{|R|} \quad (A)$$

wherein A1, A2 and A3 indicate constants.

14. A device according to claim 12, wherein the predetermined polynominal expression is the following equation (B) for determining a correction value C2:

$$C2 = \frac{LA(B1 + B2 \times V + B3 \times FRA)}{|R|} \quad (B)$$

wherein B1, B2 and B3 indicate constants.

15. A device according to claim 12, wherein the predetermined polynominal expression is the following equation (C) for determining a correction value C3:

$$C3 = \frac{LA(E1 \times V + E2 \times FRA)}{|R|} \quad (C)$$

wherein E1 and B2 indicate constants.

16. A device according to claim 12, wherein the predetermined polynominal expression has a term containing the front/rear acceleration of the vehicle,
the device further comprising
means for judging whether the vehicle is traveling with accelerated speed or traveling with decelerated speed, based on the front/rear acceleration of the vehicle,
means for applying a first constant as a factor of the term including the front/rear acceleration when the vehicle is traveling with accelerated speed, and
means for applying a second constant as the factor of the term including the front/rear acceleration when the vehicle is traveling with decelerated speed.

17. A device according to claim 12, wherein the vehicle is a four-wheel vehicle provided with four tires,
wherein the rotational angular velocity operating means include means for determining rotational angular velocities $F2_1$, $F2_2$, $F2_3$ and $F2_4$ of the four tires, and
wherein the judged value operating means includes means for substituting the rotational angular velocities $F2_1$, $F2_2$, $F2_3$ and $F2_4$ of the four tires into the following equation to determine the judged value D:

$$D = \frac{\frac{F2_1 + F2_4}{2} - \frac{F2_2 + F2_3}{2}}{\frac{F2_1 + F2_2 + F2_3 + F2_4}{4}}.$$

18. A device according to claim 12, wherein the vehicle is a four-wheel vehicle provided with four tires, and wherein the rotational angular velocity operating means includes:

means for calculating rotational angular velocities $F_1$, $F_2$, $F_3$ and $F_4$ of the four tires based on an output signal of wheel speed sensors, means for correcting the rotational angular velocities $F_1$, $F_2$, $F_3$ and $F_4$ to calculate rotational angular velocities $Fl_1$, $Fl_2$, $Fl_3$ and $Fl_4$ in which an initial difference is corrected, and means for further correcting the rotational angular velocities $Fl_1$, $Fl_2$, $Fl_3$ and $Fl_4$ in which the initial difference is corrected, to calculate rotational angular velocities $F2_1$, $F2_2$, $F2_3$ and $F2_4$ in which scatter caused by a difference in distance from a turning center of the vehicle to the respective tires is excluded.

19. A device according to claim 12, wherein the vehicle is a four-wheel vehicle provided with four tires, and wherein the rotational angular velocity operating means includes means for determining the rotational angular velocities $F2_1$, $F2_2$, $F2_3$ and $F2_4$ of the four tires, the device further comprising means for determining a speed of the vehicle, a front/rear acceleration FRA of the vehicle and a lateral acceleration LA of the vehicle, based on rotational angular velocities $F2_1$, $F2_2$, $F2_3$ and $F2_4$ of the four tires.

20. A device according to claim 12, further comprising means for determining a turning radius R wherein an influence of a load movement is excluded.

21. A device according to claim 12, wherein the judged value correcting means includes means for subtracting the correction value from the judged value D before correction to determine a judged value D' after correction.

22. A device according to claim 12, wherein the reduced pressure judging means includes means for judging that a reduced pressure tire is not present if the judged value D' after correction is within a predetermined range and a reduced pressure tire is present if the judged value D' after correction is not within the predetermined range.

* * * * *